April 19, 1949.  J. E. RINEHART  2,467,535
CORN HUSKER WITH RECIPROCATING CLEARER
Filed Feb. 23, 1945
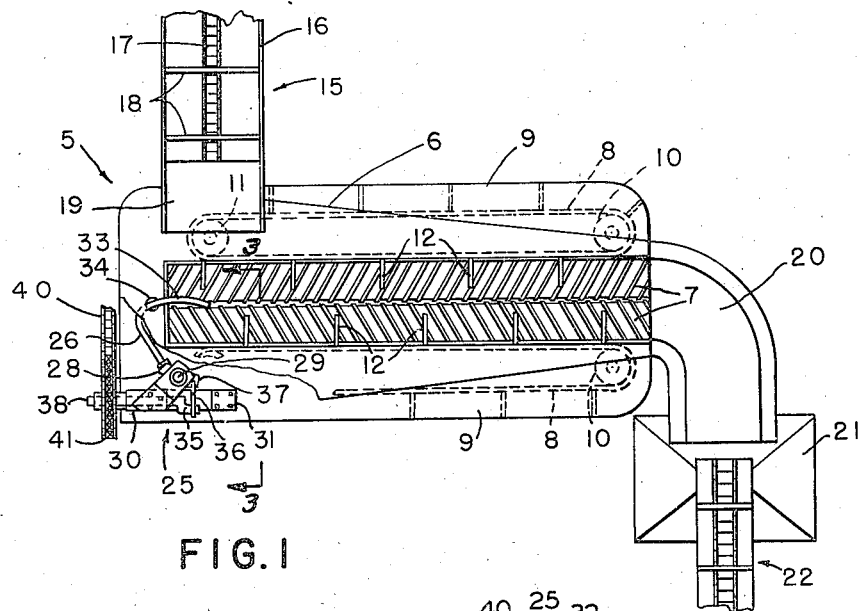
FIG.1
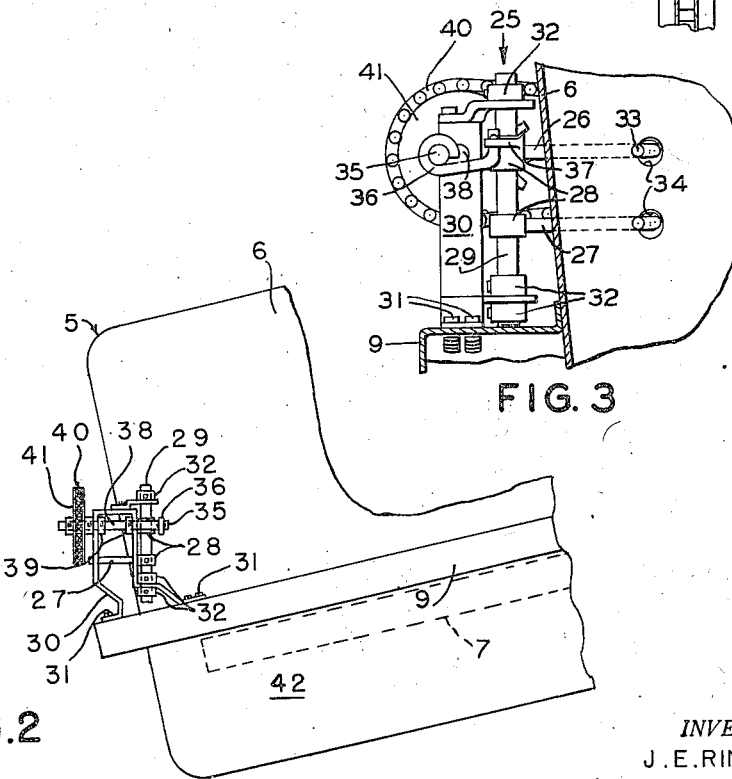
FIG.3
FIG.2
WITNESS.
CLIFFORD ZUDE
INVENTOR.
J.E.RINEHART
BY Patented Apr. 19, 1949

2,467,535

UNITED STATES PATENT OFFICE 2,467,535

CORN HUSKER WITH RECIPROCATING CLEARER

Jeremiah E. Rinehart, Marysville, Ohio, assignor to Deere & Company, Moline, Ill., a corporation of Illinois Application February 23, 1945, Serial No. 579,355

1 Claim. (Cl. 130—5)

1

The present invention relates generally to corn harvesters and more particularly to the husking mechanism on a corn harvester, and has for its principal object the provision of a novel and improved husking mechanism having means for insuring that the ears of corn will move freely along the husking rolls from the point of delivery thereto.

Heretofore, under certain crop conditions, some difficulty has been encountered due to the ears of corn accumulating in the hopper of the husking box, tending to bridge over the rolls and preventing a free and even movement of the ears along the rolls. A more specific object of my invention relates to the provision of agitating means for dislodging any ears that lodge in the hopper of the husking box.

In the accomplishment of this object, I have provided agitating means in the form of one or more fingers which extend through openings in the end of the husking box above the husking rolls, the fingers being reciprocable through the openings, thereby cooperating with the husking roll conveyor in moving the ears of corn longitudinally of the rolls.

These and other objects and advantages of my invention will be apparent to those skilled in the art after a consideration of the following description, in which reference is had to the drawings appended hereto, in which:

Figure 1 is a plan view of a husking box embodying the principles of my invention;

Figure 2 is a side elevational view: and

Figure 3 is a sectional view along a line 3—3 and drawn to an enlarged scale.

Referring now to the drawings, the husking box 5 comprises an upper hopper portion 6, in the bottom of which is journaled a pair of conventional husking rolls 7. A pair of endless chain conveyors 8 are disposed in conveyor housings 9 extending laterally from each side of the husking box. Each of the endless conveyor chains 8 is trained around a pair of sprocket members 10 and 11, which are mounted in opposite ends of the housing 9, respectively, rotating about generally vertical axes. Ear engaging paddles 12 are attached to the chains 8 in spaced relation and are adapted to extend over the adjacent husking roll for the purpose of moving the ears of corn longitudinally along the rolls while the husks are being removed, in a manner well known to those skilled in the art. A feeder conveyor 15 is mounted at one end of the husking box 5 and comprises a trough 16, within which is movably disposed an endless conveyor chain 17 having

2 paddles 18 for moving the ears of corn from the picking mechanism (not shown) and for discharging the ears over a chute 19 upon the receiving ends of the husking rolls 7. The husking box and rolls are inclined upwardly from the receiving ends of the rolls to the discharge ends of the rolls, and a discharge chute 20 is provided at the discharge ends of the rolls 7 to direct the ears of corn into a hopper 21 of a wagon elevator 22, which conveys the husked ears to a wagon or other receptacle.

The mechanism thus far described is conventional and I do not intend my invention to be limited to any of the details so far described.

Coming now to that part of the structure with which my invention is more directly concerned, it is well known to those skilled in the art that under certain conditions the ears of corn dropping from the chute 19 into the hopper 6 sometimes tend to accumulate at the end of the hopper and bridge over the husking rolls. Various types of agitating devices have been proposed for the purpose of dislodging the ears and causing them to become engaged by the paddles 12 of the conveyors 8.

The agitating mechanism of my invention is indicated in its entirety by reference numeral 25 and comprises a pair of vertically-spaced arms 26 and 27, preferably formed of rod material and supported on a pair of hub members 28, respectively, which are rigidly fixed to a generally vertical supporting shaft 29, which is journaled on a bracket 30 formed of strap material in a generally U-shaped structure, the two legs of which are secured by bolts 31 to the top of one of the chain housings 9. Collars 32 are fixed to the shaft 29 to support the latter on the bracket 30.

The arms 26 and 27 extend radially outwardly from the shaft 29 along the end of the husking box 5, and each of the arms 26 and 27 is provided with a finger 33 which turns into an aperture 34 in the hopper 6. Each of the fingers 33 is curved in an arc about the axis of the shaft 29, so that by oscillating the shaft 29 the fingers 33 can be reciprocated through the apertures 34, over the rolls. The shaft 29 is oscillated continuously during operation by means of a crank 35 connected by a link 36 to a short arm 37 mounted on one of the hubs 28. The crank 35 is provided on the end of a horizontal driving shaft 38 which extends through suitable bearing openings in the two legs of the bracket 30 and is retained therein against axial movement by means of collars 39. Power for driving the shaft 38 is supplied through a drive chain 40, which is trained over a sprocket 41 fixed to the end of the shaft 38.

During operation, the harvested ears of corn are fed by the conveyor 15 into the receiving end of the hopper 6. The ear conveyors 8 move the paddles 12 toward the right as viewed in Figure 1 to advance the ears along the husking rolls 7 which rotate in opposite directions, respectively, to grasp the husks and pull them downwardly away from the ears, the husks being discharged into the lower portion 42 of the husking box 5. The ears are discharged through the chute 20 into the wagon elevator hopper 21, from which they are conveyed by the elevator 22. The driving shaft 38 continuously rotates to oscillate the vertical shaft 29, thereby causing the curved fingers 33 to be reciprocated into and out of the hopper over the receiving end of the husking rolls 7. These reciprocating fingers prevent the ears of corn from accumulating and bridging over the ends of the rolls, and since the driving mechanism for the fingers 33 is entirely outside of the hopper, it is obvious that there is no possibility for the corn to clog the mechanism under any conditions.

I claim:

In a husking box including a pair of husking rolls rotatable on substantially parallel axes, the improvement residing in means for facilitating movement of corn ears lengthwise of the rolls, comprising: means including an end wall for the box disposed transversely to the roll axes so that the rolls extend away from the inside face of the wall, said wall including an opening therethrough positioned on an imaginary line closely above and generally paralleling the rolls; an agitator extendible and retractible into and out of the husking box through said end wall opening, including a finger alined with said opening and elongated generally lengthwise of the rolls to lie substantially in a plane closely above and parallel to the rolls and having an end portion for engaging corn ears on the rolls inside the husking box; means outside the end wall carrying said finger for reciprocation into and out of the husking box through said opening to move said ear-engaging end portion of the finger in opposite directions away from and toward the inside face of the end wall along a path generally coincident with the principal axis of the finger, and means for reciprocating the finger.

JEREMIAH E. RINEHART.

REFERENCES CITED

The following references are of record in the file of this patent:

UNITED STATES PATENTS

| Number | Name | Date |
|---|---|---|
| 716,905 | Lawter | Dec. 30, 1902 |
| 2,286,279 | Hyman et al. | June 16, 1942 |